United States Patent [19]

Shyu

[11] Patent Number: 5,292,449
[45] Date of Patent: Mar. 8, 1994

[54] SCALE INHIBITING COMPOSITION

[75] Inventor: Lawrence L. Shyu, Yorktown Heights, N.Y.

[73] Assignee: Akzo nv, Arnhem, Netherlands

[21] Appl. No.: 980,872

[22] Filed: Nov. 24, 1992

[51] Int. Cl.$^5$ ............................................. C02F 5/10
[52] U.S. Cl. .................................... 252/180; 252/82; 252/87; 252/181; 210/696
[58] Field of Search ..................... 252/82, 86, 87, 100, 252/181, 146, 186.29; 210/696, 699, 700

[56] References Cited

U.S. PATENT DOCUMENTS

| | | | |
|---|---|---|---|
| 2,204,522 | 6/1940 | Werner et al. | 210/697 |
| 3,173,874 | 3/1965 | Sewell et al. | 252/181 |
| 3,194,768 | 7/1965 | Lindner et al. | 252/100 |
| 3,454,427 | 7/1969 | Suzuki | 252/87 |
| 4,059,678 | 11/1977 | Winkley | 252/86 |
| 4,129,423 | 12/1978 | Rubin | 252/86 |
| 4,163,733 | 8/1979 | Buckman et al. | 252/86 |
| 4,238,192 | 12/1980 | Kandathil | 252/186.29 |
| 4,277,359 | 7/1981 | Lipinski | 252/181 |
| 4,294,575 | 10/1981 | Kowalski | 252/186.29 |
| 4,306,991 | 12/1981 | Hwa | 252/180 |
| 4,351,673 | 9/1982 | Lawson | 252/146 |
| 4,614,646 | 10/1986 | Christiansen | 252/186.29 |

FOREIGN PATENT DOCUMENTS 156781  12/1981  Japan .

OTHER PUBLICATIONS

Betz Handbook of Industrial Water Conditioning, Sixth Edition, 1962, pp. 232-235.
Principles of Industrial Water Treatment, Drew Chemical Corporation, 1977, pp. 81-84.

*Primary Examiner*—Prince Willis, Jr.
*Assistant Examiner*—James Silbermann
*Attorney, Agent, or Firm*—Richard P. Fennelly; Louis A. Morris

[57] ABSTRACT

Scale inhibition in a water treatment system can be achieved by using a composition which combines a butenedioic acid, such as maleic acid and/or fumaric acid, phosphorous acid, and a peroxide, such as hydrogen peroxide.

12 Claims, No Drawings

SCALE INHIBITING COMPOSITION

BACKGROUND OF THE INVENTION

Scale deposit, for example, in the form of calcium carbonate in industrial boilers cooling towers, heat exchangers and the like, is a very common and serious problem. Various types of water treatment chemicals have been proposed including chelants (e.g., EDTA and NTA), lignosulfonates, polyphosphates, polyacrylates, polymethacrylates, maleic anhydride copolymers, polymaleic anhydride, phosphate esters, and phosphonates (see Principles of Industrial Water Treatment, Drew Chemical Corporation, 1977, pp. 81-84).

U.S. Pat. No. 4,277,359 to R. J. Lipinski is one example of corrosion and mineral scale deposition inhibition in which a water soluble polymer comprising acrylic acid is used in combination with minor amounts of phosphorous acid and derivatives.

More recent U.S. Pat. No. 4,306,991 to C. M. Hwa advocates use of a copolymer of styrene sulfonic acid and maleic anhydride or maleic acid, along with a water soluble organophosphonic acid compound.

SUMMARY OF THE INVENTION

A novel scale inhibiting composition is the subject of the present invention. It comprises a combination of a water soluble unsaturated dicarboxylic acid (such as maleic acid), phosphorous acid, and an organic or inorganic peroxide, such as hydrogen peroxide.

DETAILED DESCRIPTION OF THE INVENTION

The first component in the novel scale inhibiting composition of the present invention is a water soluble unsaturated dicarboxylic acid, such as maleic acid or fumaric acid. These acids of the formula

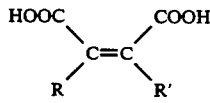

where R and R' are independently selected from hydrogen, lower alkyl, and phenyl. When R and R' are both hydrogen, maleic or fumaric acid are covered. This component can be present at from about 10% to about 60%, by weight of the composition, preferably 25% to 45%, most preferably 30% to 40%.

The second component in the composition of the present invention is phosphorous acid. It can be present at from about 3% to about 45%, by weight of the composition, preferably 5% to about 30%, most preferably 10% to 20%.

The third component in the present invention's composition is an organic or inorganic peroxide, such as hydrogen peroxide which can be present in from about 15% to about 80%, by weight of the composition, preferably 25% to 70%, most preferably 40% to 60%. Peroxides of the general formula,

ROOR' where R and R' are defined as above for the butenedioic acid component, can be used.

The above-described composition can be useful in retarding undesired mineral scale formation in water treatment systems by being present in an effective amount (e.g., from about 4 ppm to about 70 ppm, based on the weight of the total composition). Heating of the mixture of composition and water can assist in the inhibition of scale formation.

The present invention is illustrated by the Examples which follow.

EXAMPLES 1-10

Procedure for Calcium Carbonate Scale Inhibition Screening

Stock solutions of 0.294 g/l calcium chloride in distilled water and 0.212 g/l of sodium carbonate in distilled water were first prepared. Then, a dilute solution of the scale inhibitor chemical or chemicals to be tested was prepared in water at 0.2% by weight. In order to test the selected scale inhibitor, 100 ml of the sodium carbonate stock solution was added to a clean, dry eight ounce bottle followed by 1.5 g of the 0.2 wt% inhibitor solution and 100 ml of the calcium chloride stock solution. The test solution in the bottle comprised 100 mg/l calcium carbonate (theoretical) in solution and 15 ppm of the selected inhibitor chemical or chemicals and was mixed well. A "blank" test solution containing no inhibitor was also prepared. The test solutions were then placed in an oven at 65° C. for twenty-four hours followed by removal from the oven and filtration of the test solutions through filter paper with 0.5 μm pores.

The filtrate from each test solution was titrated with ethylene diamine tetraacetic acid (0.005 M) in a buffer solution formed by combining 1.179 g of disodium ethylenediaminetetraacetic acid dihydrate and 0.78 g of magnesium sulfate heptahydrate in 50 ml of water followed by addition of 16.9 g of ammonium chloride and 143 ml of concentrated ammonium hydroxide and dilution of water to 250 ml, using CALMAGITE indicator (0.1 g in 100 g of water). A sharp color change from pink to purple indicated the end point and gave the calcium ion content. The percent inhibition was calculated by the following equation:

$$\% \text{ Inhibition} = 100 \times \frac{B - C}{A - C}$$

where

A = the theoretical [$Ca^{2+}$] in the test solution, mg/l;
B = [$Ca^{2+}$] in the filtrate from the test solution containing inhibitor mg/l; and
C = [$Ca^{2+}$] in the filtrate from the blank test solution, mg/l.

The following results were achieved:

TABLE 2

| Example No. | Additive | Conc. (ppm) in Solution | Inhibition % |
|---|---|---|---|
| 1 | Maleic Acid | 15 | 17 |
| 2 | Phosphorous Acid | 6 | 17 |
| 3 | Hydrogen Peroxide | 20 | 3 |
| 4 | Maleic Acid + Phosphorous Acid | 15 + 6 | 38 |
| 5 | Maleic Acid + Phosphorous Acid* | 15 + 6 | 34 |
| 6 | Phosphorous Acid + Hydrogen Peroxide* | 6 + 20 | 38 |
| 7 | Maleic Acid + Hydrogen Peroxide* | 15 + 20 | 22 |
| 8 | Maleic Acid + Phosphorous Acid + Hydrogen Peroxide* | 15 + 6 + 20 | 86 |
| 9 | Maleic Acid + Phosphorous Acid + | 15 + 6 + 20 | 83 |

TABLE 2-continued

| Example No. | Additive | Conc. (ppm) in Solution | Inhibition % |
|---|---|---|---|
| 10 | Hydrogen Peroxide*<br>Maleic Acid +<br>Phosphorous Acid +<br>Hydrogen Peroxide* | 15 + 6 + 20 | 100 |

*The sample tested was refluxed for eight hours at a temperature of about 100° C.

In the above data, very poor inhibition is observed when the individual reagents are used individually (Example 1–3). A combination of maleic acid and phosphorous acid, when refluxed, gave better results (see Examples 4 and 5). The combination of either phosphorous acid or maleic acid and hydrogen peroxide, when refluxed, also gave rather poor results (Examples 6 and 7). The inventive combination of maleic acid, phosphorous acid, and hydrogen peroxide gave consistently high levels of calcium carbonate (see Examples 8–10).

EXAMPLES 11–14

A series of compositions were tested as described in Examples 1–10 using 15 ppm of maleic acid, 6 ppm of phosphorous acid, and, optionally, variable amounts of hydrogen peroxide as shown in Table 2 which follows:

TABLE 2

| Example No. | Hydrogen Peroxide Amount (ppm) | Inhibition % |
|---|---|---|
| 11 | 0 | 24 |
| 12 | 4 | 69 |
| 13 | 10 | 69 |
| 14 | 20 | 86 |

The foregoing illustrate certain embodiments of the present invention and, for that reason, should not be construed in a limiting sense. The scope of protection sought is set forth in the claims which follow.

I claim:

1. A scale inhibiting composition for use in water treatment systems which comprises a combination of from about 10% to about 60%, by weight of the composition, of a water soluble unsaturated dicarboxylic acid, from about 3% to about 45%, by weight of the composition, of phosphorous acid, and from about 15% to about 80%, by weight of the composition, of a peroxide.

2. A composition as claimed in claim 1 wherein the dicarboxylic acid is selected from the group consisting of maleic acid and fumaric acid and the peroxide is hydrogen peroxide.

3. A composition as claimed in claim 2 wherein the hydrogen peroxide is present at from about 25% to about 70%, by weight of the composition.

4. A composition as claimed in claim 1 wherein the dicarboxylic acid is present at from about 25% to about 45%, by weight of the composition.

5. A composition as claimed in claim 2 wherein the dicarboxylic acid is present at from about 25% to about 45%, by weight of the composition.

6. A composition as claimed in claim 3 wherein the dicarboxylic acid is present at from about 25% to about 45%, by weight of the composition.

7. A composition as claimed in claim 1 wherein the phosphorous acid is present at from about 5% to about 30%, by weight of the composition.

8. A composition as claimed in claim 2 wherein the phosphorous acid is present at from about 5% to about 30%, by weight of the composition.

9. A composition as claimed in claim 3 wherein the phosphorous acid is present at from about 5% to about 30%, by weight of the composition.

10. A composition as claimed in claim 1 wherein the dicarboxylic acid is present at from about 30% to about 40%, the phosphorous acid is present at from about 10% to about 20%, and the peroxide is present at from about 40% to about 60%.

11. A composition as claimed in claim 10 wherein the peroxide is hydrogen peroxide.

12. A composition as claimed in claim 10 wherein the peroxide is hydrogen peroxide and the dicarboxylic acid is selected from the group consisting of maleic acid and fumaric acid.

* * * * *